United States Patent [19]

Inoue

[11] 4,427,870
[45] Jan. 24, 1984

[54] METHOD OF AND APPARATUS FOR ELECTROEROSIVELY MACHINING A CONDUCTIVE WORKPIECE WITH A CONTINUOUS WIRE ELECTRODE

[75] Inventor: Kiyoshi Inoue, Tokyo, Japan

[73] Assignee: Inoue-Japax Research Incorporated, Yokohama, Japan

[21] Appl. No.: 279,312

[22] Filed: Jul. 1, 1981

[30] Foreign Application Priority Data

Jul. 4, 1980 [JP] Japan ................................. 55-90670

[51] Int. Cl.³ ............................................... B23P 1/08
[52] U.S. Cl. ............................... 219/69 W; 219/69 M
[58] Field of Search ............... 219/69 W, 69 M, 69 R, 219/69 V, 69 S

[56] References Cited

U.S. PATENT DOCUMENTS 3,912,899 10/1975 Lehmann et al. ................. 219/69 V

FOREIGN PATENT DOCUMENTS

| 54-141490 | 11/1979 | Japan | 219/69 W |
| 55-164441 | 12/1980 | Japan | 219/69 W |
| 56-76338 | 6/1981 | Japan | 219/69 W |
| 2062527 | 5/1981 | United Kingdom | 219/69 W |
| 524658 | 10/1976 | U.S.S.R. | 219/69 W |

Primary Examiner—M. H. Paschall
Attorney, Agent, or Firm—Karl F. Ross; Herbert Dubno

[57] ABSTRACT

An electroerosive wire-cutting method and apparatus in which the traveling wire electrode is heated in its position-setting step prior to a desired machining operation so as to establish for the operative section of the wire electrode thermal conditions the same as those to be experienced during the machining operation. Such heating may be effected, for example, by passing a heating current through that section of the wire electrode from an independent heating current source via wire guides.

15 Claims, 1 Drawing Figure

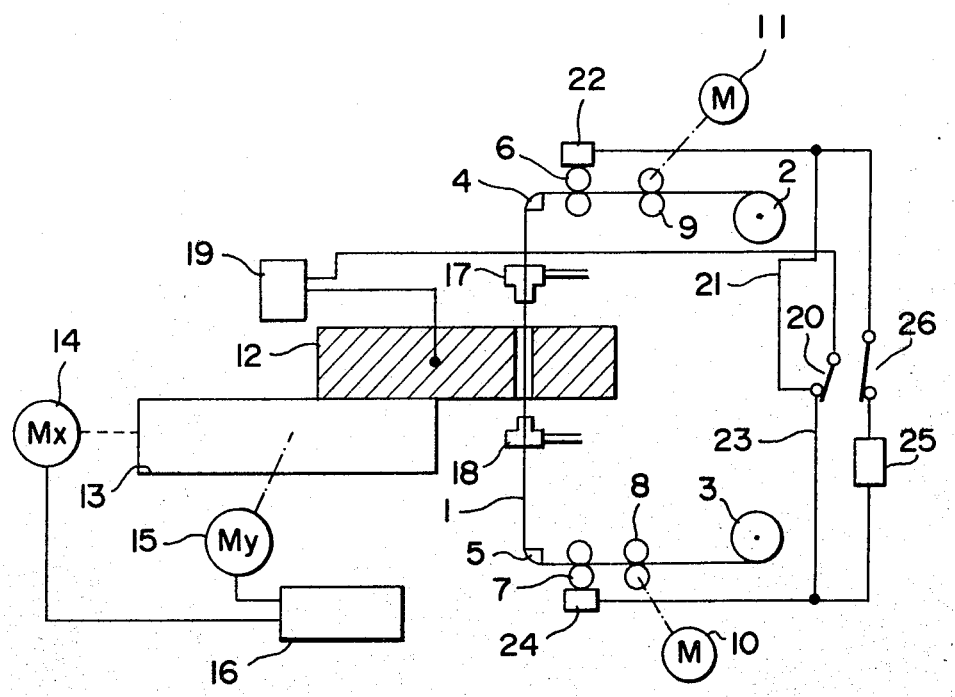

METHOD OF AND APPARATUS FOR ELECTROEROSIVELY MACHINING A CONDUCTIVE WORKPIECE WITH A CONTINUOUS WIRE ELECTRODE

FIELD OF THE INVENTION

The present invention relates to wire-cutting electroerosion machining and, more particularly, to an improved method of and apparatus for electroerosively machining an electrically conductive workpiece with a continuous wire electrode which is mounted to pass through the workpiece along a straight line path across a pair of machining guide members and is continuously transported from a supply side to a takeup side. The workpiece is juxtaposed with the traveling wire electrode across a machining gap flushed with a liquid machining medium while an electroerosion machining current is passed between the wire electrode and the workpiece to electroerosively remove material from the latter. As material removal proceeds, the workpiece is displaced relative to the traveling wire electrode along a prescribed path to form a desired machined contour therein.

BACKGROUND OF THE INVENTION

Typically, a wire-cutting electroerosion machining operation commences at a predetermined start position on a lateral surface on the workpiece but, quite often, also with a starting hole preformed at the preselected position in the workpiece securely mounted on a worktable. The latter is situated in a predetermined plane, X-Y, and is movable by a pair of drive motors along one and the other coordinate in the two-dimensional coordinate system, i.e. in the directions of the X-axis and Y-axis. The positioning of the workpiece relative to the wire electrode should thus occur initially by driving these motors to precisely locate and align the predetermined start position of the workpiece or the preformed starting hole therein with the preset straight line path defined between the aforesaid machining guide members and then loading the wire electrode on the machining guide members or threading the wire electrode through the precision located starting hole of the workpiece. The preset straight line path lies transversely to the aforesaid X-Y plane, i.e. the surface of the workpiece. The threaded or loaded wire electrode must be precisely in alignment with the straight path through the hole and thus is kept taut between the machining guides all the way from the supply side to the collection side. To this end, a traction drive and a brake means are provided at the takeup side and supply side in the wire travel path, respectively. Only when the foregoing positioning step is completed, may the desired wire-cutting electroerosion machining operation be initiated by (a) permitting the threaded or positioned wire electrode to be continuously and axially transported, the control of the traction drive and brake means, respectively (b) supplying the machining region of the workpiece and the wire electrode with the machining liquid and (c) applying the electroerosion machining current between the wire electrode and the workpiece as mentioned above. Then the aforementioned relative machining displacement between the wire electrode and the workpiece along a prescribed contouring feed path is effected controlledly, typically under commands of a preprogrammed numerical control (NC) equipment. In the continuous path of travel of the wire electrode between the supply and collection sides, a number of rollers are typically arranged to allow the wire electrode to be smoothly displaced axially along the path. Furthermore, each of the wire supply and collector or takeup means is typically constituted by a rotating reel.

It has been observed that the axially displaced wire electrode is subject to irregular stresses along such a continuous path of travel and hence tends to deform irregularly and it has long been recognized that a sufficient tension should be applied by the traction drive and brake means respectively to the traveling wire electrode in order to minimize the variation of deformation thereof throughout the given machining operation because any variation tends to cause an undesirable deflection or oscillation of the wire electrode between the machining guides, which in turn causes serious machining inaccuracy. Thus, it has been assumed that solely mounting the continuous wire electrode on the electrode support and guidance system so that it is tightly stretched under a given sufficient tension all the way from the supply means to the takeup means and then driven along the path in the wire positioning step provides a precise positioning of the wire electrode relative to the workpiece during the course of a given electroerosive wire-cutting operation.

The inventor has now discovered that the conventional technique of positioning the wire electrode relative to the workpiece required preparatory to the given wire-cutting electroerosion machining operation is not satisfactory and is even defective, and is indeed one of the most significant causes by virtue of which the conventional wire-cut contour has a limited machining accuracy. It has been found that the physical characteristics of the machining guides and even further of the other support members in the total wire guidance and support system are largely affected by the wire electrode placed in the electroerosion machining system. Accordingly, a significant change in the wire guiding characteristic and position of the system is created between the state when the wire is not energized with the electroerosion machining current and the state when the wire is energized. The change occurs primarily due to heat developed through the wire electrode engaged in the electroerosion machining action, thus due to heat developed by the electrical discharges and/or high-amperage electrical machining current.

OBJECTS OF THE INVENTION

It is, therefore, an important object of the present invention to provide a novel and improved electroerosive wire-cutting method which affords an increased machining accuracy in the workpiece and practically eliminates the machining inaccuracy which has been encountered heretofore due to the thermal effect on the machine positioning system.

Another important object of the invention is to provide a novel and improved electroerosive wire-cutting apparatus for carrying out the method described.

SUMMARY OF THE INVENTION

In accordance with the present invention there is provided in a first aspect thereof a method of electroerosively machining a conductive workpiece with a continuous wire electrode, which method includes the step of, in the wire loading or positioning step preparatory to a given wire-cutting electroerosive machining operation, heating the wire electrode so as to place it in substantially the same thermal condition as when the wire electrode is engaged in the given wire-cutting electroerosive machining operation.

Thus, the invention provides a method of electroerosively machining an electrically conductive workpiece with a continuous wire electrode, comprising the steps of: (a) disposing the wire electrode in a predetermined path of continuous wire travel commencing with a wire supply means and ending with a wire collector or takeup means and including a pair of machining guide members defining a straight line path therebetween; (b) positioning the workpiece to locate a predetermined cutting-start point thereon in alignment with the said straight line path; (c) axially driving the wire electrode to cause it to be progressively fed out of the supply means and fed into the collector means and to travel continuously along the predetermined continuous travel path while applying a predetermined tension thereto at least across the machining guide members; (d) heating at least a portion of the wire electrode traveling between and guided by the machining guide members in step (c) to bring it into alignment with the said straight line path; and thereafter (e) initiating the electroerosive machining of the workpiece by effecting step (c) while passing from an electroerosion machining power supply an electroerosion machining current between the wire electrode and the workpiece across a machining gap flushed with a machining liquid and initiating relative displacement between the axially traveling wire electrode and the workpiece along a prescribed path commencing with the cutting-start point, the wire electrode being heated in step (c) so as to place it in a thermal condition substantially equivalent to that in which it is when engaged in the electroerosive machining of step (e).

More specifically, the wire electrode is heated in step (c) by passing an electric current directly through the wire electrode at least along a length thereof includes the traveling wire stretch between the machining guide members, the electric current being of a magnitude sufficient to resistively heat the wire electrode and thereby to place it in the said equivalent thermal condition. The wire electrode is heated to a temperature in excess of 100° C. and preferably between 150° and 200° C. Alternately or in addition, the wire electrode may be heated indirectly by heating at least one of the machining guide members. The heating current is preferably supplied from a current source that is independent of the wire electrode in step (e). The step (a) may be carried out either prior to or subsequent to step (b). Preferably, the machining liquid is supplied to the heated wire electrode in the region of the machining gap in step (c).

The invention also provides, in a second aspect thereof, an apparatus for electroerosively machining an electrically conductive workpiece with a continuous wire electrode, which apparatus comprises: a wire support and guidance assembly for defining a predetermined continuous path of wire travel between a wire supply means and a wire collector or takeup means, the assembly including a pair of machining guide members defining a straight line path therebetween included in the continuous path; machining feed and positioning means; wire drive and traction brake means for axially driving the wire electrode to cause it to be progressively fed out of the supply means and fed into the collector means and to travel continuously along the predetermined continuous travel path while applying a predetermined tension thereto at least across the machining guide members; an electroerosion machining power supply operable for the electroerosion machining of the workpiece by passing an electroerosion machining current through a machining gap defined between the traveling wire electrode and the workpiece and flushed with a machining liquid while the traveling wire electrode and the workpiece are relatively displaced along a prescribed path with the machining feed and positioning means; and heating means operable prior to the electroerosion machining of the workpiece when the workpiece is positioned with the machining feed and positioning means to locate a predetermined cutting-start point thereon with which the prescribed path commences in alignment with the said straight line path and when the wire electrode is axially driven by the wire traction drive and brake means to be progressively fed out of the supply means and fed into the collector means and to travel continuously along the predetermined continuous travel path while the predetermined tension is applied to the traveling wire electrode at least across the machining guide members, the heating means being operable for heating at least a portion of the wire electrode traveling between and guided by the machining guide members to bring it in alignment with the straight line path and whereby the wire electrode is heated so as to place it in a thermal condition substantially equivalent to that in which it is when engaged in the electroerosion machining of the workpiece.

More specifically, the heating means is arranged to heat at least one of the machining guide members. A heating control means is preferably associated with the heating means for maintaining the temperature of the wire electrode or the said at least one of the machining guide members in excess of 100° C. and, preferably, in a range between 150° and 200° C. The heating means may comprise a heating current source for passing an electric current directly through the wire electrode at least along a length thereof which includes the traveling wire stretch between the machining guide members. The apparatus may further include control means (c) associated with the heating current source to maintain the temperature of the heated wire electrode in a range between 150° and 200° C. The apparatus may further include switch means for selectively connecting the heating current source electrically to the wire electrode while the electroerosion machining power supply is held electrically disconnected from the wire electrode and the workpiece prior to the electroerosion machining of the workpiece and (b) for disconnecting the heating current source electrically from the wire electrode and connecting the machining power supply electrically to the wire electrode and the workpiece to initiate the electroerosion machining of the workpiece.

BRIEF DESCRIPTION OF THE DRAWING

In the drawing, the sole FIGURE is a schematic view diagrammatically illustrating an apparatus according to the present invention.

SPECIFIC DESCRIPTION

The wire-cutting electroerosion machine there shown makes use of a continuous wire electrode 1 disposed in a predetermined continuous path of wire travel commincing with a wire supply 2 shown as a storage reel and ending with a wire collector 3 shown as a takeup reel. The continuous wire travel path includes a pair of machining guide members 4 and 5, shown as scaphoidal guides, for defining therebetween a straight line path for the wire electrode 1. The wire electrode 1 typically is composed of copper or brass and has a thickness typically from 0.05 to 0.5 mm. A number of other wire guide members are customarily arranged between the supply 2 and the takeup 3 and distributed along the path upstream of the one machining guide 4 and in the path downstream the other machining guide 5. Two such wire guides 6 and 7 are shown, each comprising a pair of abutting rollers for guiding the wire electrode 1 therebetween, and are located immediately upstream and downstream of the machining guide members 4 and 5, respectively. Further shown are a wire drive unit 8 and a wire brake unit 9 arranged in the path between the wire guide 7 and the wire collector 3 and in the path between the wire guide 6 and the wire supply 2, respectively. The wire drive or traction unit 8 comprises a pair of abutting rollers one of which is rotatable and the other of which is rotationally driven by a motor 10 for driving the wire electrode 1 therebetween. The wire brake unit 9 comprises a pair of abutting rollers one of which is rotatable and the other of which is rotationally driven by a motor 11 for driving the wire electrode 1 therebetween. The rate of rotation of the motor 10 is greater by a predetermined difference than that of the motor 11 so that the wire electrode 1 is continuously fed out of the supply 2 and fed into the collector 3 and travels continuously at a predetermined rate of axial displacement, say, of 10 to 30 mm/sec along the continuous travel path under a predetermined tension corresponding to the difference in the rates of rotation of the motors 10 and 11.

A workpiece 12 is securely mounted on a worktable 13 situated in an X-Y plane and, during the course of a given electroerosion machining operation, is displaced by a motor 14, e.g. a stepping motor, along the X-axis and by a motor 15, e.g. a stepping motor, along the Y-axis. The motors 14 and 15 are fed with drive signals from a numerical-control (NC) unit 16 which has their preprogrammed data or instructions which describe a prescribed cutting path relative to the wire electrode 1 traveling between the machining guide members 4 and 5, to be followed by the workpiece while electroerosion machining proceeds across a machining gap defined between the traveling wire electrode 1 and the workpiece 12 to electroerosively remove material from the workpiece 12. The machining gap is supplied with a machining liquid, e.g. deionized water or an aqueous solution of electrolyte, which is delivered from a supply, shown by a pair of nozzles 17 and 18 communicating via a pump (not shown) with a reservoir (not shown) for the machining liquid.

An electroerosion machining power supply 19 has a pair of output terminals one of which is shown connected electrically to the workpiece 12 and the other of which is connected to one contact of a switch 20 whose other contact is on one hand connected via a conductor 21 to a conducting brush 22 being in contact with the electrically conductive roller of the wire guide 6 and on the other hand connected via a conductor 23 to a conducting brush 24 being in contact with the electrically conductive roller of the wire guide 7. Thus, when the switch 20 is closed, an electroerosion machining current is passed between the wire electrode 1 and the workpiece 12 across the machining gap flooded with the machining liquid to electroerosively remove material from the workpiece 12. Typically, and preferably, the electroerosion machining current is in the form of a succession of pulses. The parameters of the machining current or machining pulses, e.g. pulse on-time and peak current, are selected to establish a desired machining condition to yield desired machining results, e.g. desired overcut, surface finish and removal rate.

Prior to proceeding with the electroerosion machining of the workpiece 12, it is necessary that the workpiece 12 be positioned to locate a predetermined cutting-start point thereon in alignment with the straight line path defined between the machining guide members 4 and 5. This can be achieved by displacing the worktable 13 with or without the motors 14 and 15 until the controller 16 indicates coincidence between the actual position and the preprogrammed cutting-start position of the workpiece 12. The cutting-start point may lie either on a lateral or peripheral surface of the workpiece 12 or at a point inside the lateral or peripheral surfaces of the workpiece 12. In the latter case, a hole is preformed at the start point in the workpiece and that hole has to be located prior to threading the wire electrode 1 through the hole and thus through the workpiece 12. In the former case, the start point may be located prior or subsequent to setting the wire electrode on its path extending continuously between the supply 2 and the collector 3 on the wire support and guidance assembly which includes the drive members 8, brake members 9, wire guide members 6 and 7 and machining guide members 4 and 5.

In the conventional practice, workpiece positioning and wire setting i.e. the work/wire loading step is finished simply by driving the setup wire electrode axially with the drive and brake units 8 and 9 to allow it to be tightly stretched and, as so stretched, to travel smoothly between the machining guide members 4 and 5 and between the supply 2 and the collector 3. As pointed out hereinbefore, it has been found that this procedure leads to a significant machining inaccuracy during the course of a machining operation due to a change in the physical characteristics of the wire electrode and the machining guide system when engaged in the electroerosion operation.

To solve this problem in accordance with the present invention there is provided a heating current source 25 which is connected on one hand to the conducting brush 24 and on the other hand to the conducting brush 22 via a switch 26. In the wire loading step, the wire electrode 1 is axially driven by the drive and brake units 8–11 so as to be continuously fed out of the supply 2 and fed into the collector 3 and to continuously travel along the continuous path at the same rate of displacement as in the subsequent electroerosion machining operation under the same tension as in the subsequent electroerosion machining operation. The switch 26 is closed to pass the heating current from the source 25 directly through the wire electrode 1 traveling between the wire guides 6 and 7 and between the machining guides 4 and 5, thereby heating up the part of the traveling wire electrode 1. The current source 25 may supply either DC or AC. A current setting circuit is associated with the heating current source 25 to adjust the magnitude of the output current thereof to hold the temperature of the heated section of the wire electrode 1 in a range between 150° and 250° C. or less. A thermometer may be arranged proximal to the heated section of the traveling wire electrode 1 to measure the temperature thereof and a feedback control circuit may be provided for acting in response to the thermometer on the control circuit for the source 25 so that the temperature of the heated wire electrode is held at a predetermined value or in a predetermined range. The thermometer may detect the electrical resistance of the heated wire electrode as an indication of the temperature thereof, and may be replaced if desired by a thermistor being in contact with the wire electrode. The heating of the wire electrode in this manner in the wire positioning and setting stage places the wire electrode in a thermal condition substantially equivalent to that which develops in the subsequent electroerosion machining of the workpiece. The wire electrode 1 is sufficiently stretched to the same extent and the machining guide members 4 and 5 undergo the same thermal deformation as in the subsequent electroerosion machining operation so that in such operation the wire electrode 1 is brought precisely in alignment with the straight line path between the machining guide members 4 and 5 established in locating the cutting-start point of the workpiece 12. It is desirable that the wire electrode when heated be flooded with the machining liquid in the same manner as it is when engaged in the electroerosion machining operation so that the wire electrode when so cooled by said machining liquid has an elevated temperature in the range described.

In the machining operation, the switch 26 is opened to disconnect the heating current source 25 from the wire electrode 1 and the switch 20 is closed to connect the machining power supply 19 to the wire electrode 1 and the workpiece 12. Since the wire electrode 1 guided by the machining guide members 4 and 5 has been loaded and positioned relative to the workpiece 12 in the thermal condition equivalent to that appertaining during the machining operation, machining to proceed with due precision.

What is claimed is:

1. A method of electroerosively machining an electrically conductive workpiece with a continuous wire electrode, comprising the steps of:
   (a) disposing the wire electrode in a predetermined path of continuous wire travel commencing with a wire supply means and ending with a wire collector means and including a pair of machining guide members defining a straight line path therebetween; thereafter
   (b) positioning said workpiece to locate a predetermined cutting-start point thereon for a given electroerosive-machining course in alignment with said straight line path;
   (c) axially driving said wire electrode to cause it to be progressively fed out of said supply means and fed into said collector means and to travel continuously along said predetermined continuous travel path while applying a predetermined tension thereto at least across said machining guide members;
   (d) in step (b), heating the wire electrode between said machining guide members; and
   (e) subsequent to step (b) and termination of step (d), initiating said course of electroerosive machining of said workpiece by continuing step (c), passing from an electroerosion machining power supply an electroerosion machining current between said wire electrode and the workpiece across a machining gap flushed with a machining liquid and initiating relative displacement between the axially travelling wire electrode and the workpiece along a prescribed path commencing with said cutting-start point the wire electrode being heated in step (d) so as to place it in a thermal condition substantially equivalent to that in which it is when engaged in said electroerosive machining course of step (e).

2. The method defined in claim 1 wherein the wire electrode is heated in step (c) by heating at least one of said guide members.

3. The method defined in claim 2 wherein said at least one of said guide members is heated to a temperature in excess of 100° C.

4. The method defined in claim 1 wherein the wire electrode is heated in step (c) by passing an electrical current directly through said wire electrode at least along a length thereof which includes the traveling wire stretch between said machining guide members, said electric current being of a magnitude sufficient to resistively heat the wire electrode and thereby to place it in said equivalent thermal condition.

5. The method defined in claim 4 wherein said wire electrode is heated to a temperature between 150° and 200° C.

6. The method defined in claim 4 or claim 5 wherein said heating current is supplied from a current source independent of said electroerosion machining power supply and is disconnected from said wire electrode in step (e).

7. The method defined in claim 1 wherein step (a) is carried out prior to step (b).

8. The method defined in claim 1 wherein step (a) is carried out subsequent to step (b).

9. The method defined in claim 1, further comprising the step of supplying said machining liquid to said heated wire electrode in the region of the machining gap in step (c).

10. An apparatus for electroerosively machining an electrically conductive workpiece with a continuous wire electrode, the apparatus comprising:
   a wire support and guidance assembly for defining a predetermined continuous path of wire travel between a wire supply means and a wire collector means, said assembly including a pair of machining guide members defining a straight line path therebetween included in said continuous path;
   machining feed and positioning means;
   wire drive and brake means for axially driving said wire electrode to cause it to be progressively fed out of said supply means and fed into said collector means and to travel continuously along said predetermined continuous travel path while applying a predetermined tension thereto at least across said machining guide members;
   an electroerosion machining power supply operable in a given course of the electroerosion machining of said workpiece to pass an electroerosion machining current through a machining gap defined between said traveling wire electrode and said workpiece and flushed with a machining liquid while said traveling wire electrode and said workpiece are relatively displaced along a prescribed path with said machining feed and positioning means; and
   heating means operable prior to and inoperable during, said course of the electroerosion machining of said workpiece and selectively operable while said workpiece is being positioned with said machining feed and positioning means to located a predetermined cutting-start point thereon with which said prescribed path commences for said electroerosion machining course in alignment with said straight line path while said predetermined tension is applied to said traveling wire electrode at least across said machining guide members, said heating means being operable for heating at least a portion of the wire electrode between and guided by said machining guide members whereby the wire electrode is heated so as to place it in a thermal condition substantially equivalent to that in which it is when engaged in said course of the electroerosion machining of said workpiece.

11. The apparatus defined in claim 10 wherein said heating means is arranged to heat at least one of said machining guide members.

12. The apparatus defined in claim 11, further comprising heating-control means associated with said heating means for maintaining the temperature of said at least one of the machining guide member in excess of 100° C.

13. The apparatus defined in claim 10 wherein said heating means comprises a heating current source for passing an electric current directly through said wire electrode at least along a length thereof which includes the traveling wire stretch between said machining guide members.

14. The apparatus defined in claim 13, further comprising control means associated with said heating current source for adjusting the magnitude of said heating current to heat said wire electrode to a temperature between 150° and 200° C.

15. The apparatus defined in claim 13 or claim 14, further comprising switch means (a) for selectively connecting said heating current source electrically to said wire electrode while said electroerosion machining power supply is held electrically disconnected from said wire electrode and said workpiece prior to the electroerosion machining of the workpiece and (b) for disconnecting said heating current source electrically from said wire electrode and connecting said machining power supply electrically to said wire electrode and said workpiece to initiate the electroerosion machining of said workpiece.

* * * * *